US006852026B2

(12) United States Patent
Huang

(10) Patent No.: US 6,852,026 B2
(45) Date of Patent: Feb. 8, 2005

(54) VIDEO AND REEL CARD GAME

(75) Inventor: Sming Huang, Monmouth, NJ (US)

(73) Assignee: American Alpha, Inc, Monmouth Junction, NJ (US)

(*) Notice: Subject to any disclaimer, the term of this patent is extended or adjusted under 35 U.S.C. 154(b) by 349 days.

(21) Appl. No.: 09/900,789

(22) Filed: Jul. 6, 2001

(65) Prior Publication Data

US 2003/0008699 A1 Jan. 9, 2003

(51) Int. Cl.[7] .............................. A63F 13/00; A63F 1/00
(52) U.S. Cl. ...................................... 463/16; 273/143 R
(58) Field of Search ................................ 463/1, 12–13, 463/16, 18–22, 30–31, 35, 37, 46; 273/138.1, 138.2, 139, 143 R, 292–293, 303, 309; 434/118

(56) References Cited

U.S. PATENT DOCUMENTS 4,657,256 A * 4/1987 Okada .......................... 463/21
4,700,948 A * 10/1987 Okada ..................... 273/143 R
5,820,460 A * 10/1998 Fulton .......................... 463/13
5,934,998 A * 8/1999 Forte et al. ................... 463/12
6,176,781 B1 * 1/2001 Walker et al. ................ 463/13
6,302,790 B1 * 10/2001 Brossard ...................... 463/20

* cited by examiner

*Primary Examiner*—Kim Nguyen
(74) *Attorney, Agent, or Firm*—John Lezdey

(57) ABSTRACT

The combination of a video card game and a reel card game apparatus having a video display of playing cards and at least one reel displaying playing card indicia. One of the card displays being controlled by a programmed microprocessor. The other card display being manually controlled by a player

10 Claims, 3 Drawing Sheets

VIDEO AND REEL CARD GAME

FIELD OF THE INVENTION

The present invention relates to a video card game amusement apparatus in combination with a reel card game feature. More particularly, there is provided an amusement apparatus in which a card game, in association with a video program and a computer, provides a hand and a mechanical reel controlled by the player controls the result of an opposing hand.

BACKGROUND OF THE INVENTION

Reel-type slot machines are well known and have been employed in both conventional slot machine games as well as card games. The traditional slot machine has a series of annular reels disposed in side-by-side relationship that rotate separately about a common axis. Players' scores or winnings are indicated by indicia on the peripheral surfaces of the reels that may align in any number of different combinations following a period of rotation of the reels. Players of gaming apparatus typically find it enjoyable to have a variety of different forms of gaming apparatus available. For this purpose, slot machines of the spinning reel type have been provided with a variety of different graphics, cabinet configurations and other varied embellishments such as varying visual or sound effects and differing scoring systems for example. Modifications of slot machines of this kind to enhance player enjoyment are circumscribed if the above-described basic geometry of mechanical components of the apparatus is retained. The side-by-side reel arrangement has in the past imparted an undesirable degree of similarity to slot machines of this type notwithstanding the superficial variations of the above-described kind.

With the advent of computer technology, electronic slot machines were designed. Initially, the electronic slot machines did not employ reels. Rather, these machines utilized a video screen to simulate a reel. These machines were of limited commercial success. Eventually, electronic-type reel machines were developed. These machines removed the game from the reels and played the game in a microprocessor. The reels became simply a method of displaying the results of the game. Such a machine is taught in U.S. Pat. No. 4,095,795. In these machines "virtual reels", are represented by random number generators in a microprocessor. The random number generators generate a number and that number corresponds to a reel position on the physical reel. In other words, the numbers of the random number generators are mapped to the physical reel positions. Initially, these virtual reel machines generated one number for each position on the reel, thus there was a direct mapping and the odds were not changed. Subsequently, the concept of many to one mapping was introduced and it allowed the odds associated with virtual reel machines to be adjusted (See U.S. Pat. No. 4,448,419). These machines use random number generators to generate numbers from a range of numbers that exceeds the number of physical reel combinations. These numbers are mapped to certain reel combinations with multiple numbers being mapped to some combinations. In this manner, the odds of displaying some combinations will exceed the odds of displaying other combinations thereby allowing for higher payout odds. However, this concept was not used for card games.

In operation, the virtual reel slot machines generate a number with a random number generator. That number is then put into a lookup table to ascertain the appropriate display and payout. This whole procedure is independent of the physical reels.

The use of only computer controlled reel type card games and computer controlled video card games has resulted in a loss of confidence by the player as to his ability to control the results of the game. The card amusement game player has become to believe that the game of chance no longer exists and that the outcome and payout is all controlled by the house, which has programmed the computer to the number and degree of payouts.

U.S. Pat. No. 5,938,529 to Rodesch et al, which is herewith incorporated by reference, discloses a reel type slot machine having a microprocessor driven game control circuit including a reel driven by a stepper motor, which could be used, in the present invention.

U.S. Pat. No. 6,105,962 to Malavazos et al, which is herein incorporated by reference, discloses an amusement apparatus that contains two separate games. One game is a conventional reel game and the other game has a plurality of rotatable disks having spaced apart indicia that encircle the disks and provide a score when the indicia rest at any of a plurality of angular orientations.

It is therefore proposed to provide a card game amusement apparatus in which the player can determine the outcome of at least one hand whose outcome has not been predetermined by the computer.

SUMMARY OF THE INVENTION

In accordance with the invention, there is provided a card game amusement apparatus having a reel device displaying card indicia and a video card display. Accordingly, the video card game device displays cards in a first region on the apparatus and the reel device displays cards on a second region of the apparatus. The card displays on the first region is associated with a microprocessor that controls the starting and stopping of the device and controls the probability of the card value and suit on stoppage. The other of the card displays us mechanical and has a manual control for a player to determine the probability of the card value and suit.

Preferably, the game on the apparatus is similar to the game of blackjack, and one display region represents the initial hand of the dealer another display region displays additional cards and the player.

In a single hand card game in which different hands have a win, such as in draw poker, the additional cards are selected by the luck of the player.

It is therefore a general object of the invention to provide a card game amusement apparatus in which one player's hand is mechanically displayed on rotatable reels.

It is another object of the invention that the first hand displayed is generated by a microprocessor.

It is a further objective of the invention that a player can control the probablilty of the cards displayed.

The objects and advantages of the invention will be better understood in the drawings and preferred embodiments, which follow.

DESCRIPTION OF THE PREFERRED EMBODIMENTS

Figure 1:
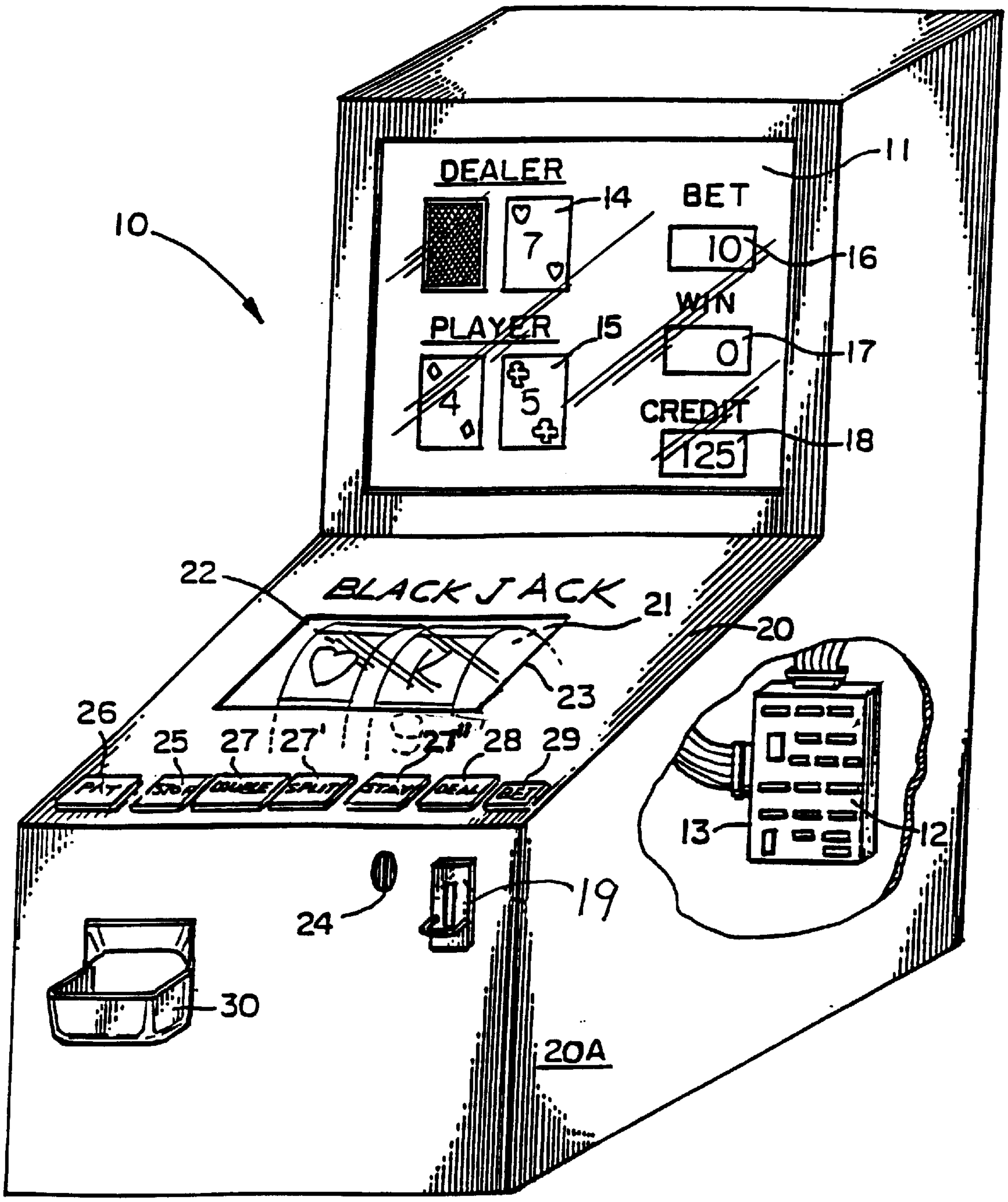
FIG. 1 illustrates a card g e apparatus for playing a card game.

According to one embodiment of the invention there is provided a card game apparatus 10 which can be employed for the playing of a card game such as blackjack. The apparatus contains a first region 11, which contains a memory device 12 in which every processing program is stored and a computer 13 for controlling operations of the processing programs.

The first region 11 contains a two card video display 14 for a dealer in the game of blackjack and a two card video display 15 for a player. The card display 14, 15 are controlled by programs in the computer.

On the first region 11 there may be provided additional displays, which are controlled by the microprocessor 13, for example a bet display 16, to show amount won and a credit display 18 to show total amount of credits won.

In a second display region 20, there is provided a display of mechanically driven reels 21, 22 having an annular band of card indicia of a card value and suit, are indicated in the display area 23. There may be included a start button 24, which initiates the game at the region 11, 20. The apparatus 10 has a stop button 25 that is used by the player to control the reel game. Preferably, the player uses the button 25 to control the stoppage of the reels 21, 22. If the reels 21, 22 are not controlled by a microprocessor, the player will believe that he has control of the chance of a particular card appearing than if controlled by a programmed microprocessor.

In the game of blackjack, either the region 11, or 20, can represent the dealer. The player can have the option of controlling his hand or that of the dealer.

Within the apparatus it is provided a conventional game control apparatus in a microprocessor 13 for controlling the game apparatus for the video display to cause video reels 14 and 15 to stop at predetermined stopping positions. Game control circuits which normally include a microprocessor and associated memory input and output circuits receive signals from a coin input detector (not shown) in the coin slot 19 and the microprocessor 13 selects a game result which requires video reels 14 and 15 to stop at a predetermined area which will display the results. Such display can be either for the dealer or the player. The microprocessor 13 utilizes a stored random number generating algorism, selects a game result that requires stoppage of the video reels 14, 15 at predetermined stopping positions that will be displayed at region 11. The cards can be either the dealer's hand or the player's hand whereby, the outcome of the game will be determined by the player of the reels 21 and 22.

Indicia are imprinted on the visible regions of each reel 21, 22 and are arranged in annular bands of indicia which are centered on the axis of rotation. The indicia of each reel 21, 22 can represent suit and value as shown or both suit and value. As in other slot machines, a player or dealer's score is determined by the particular indicia which comes to rest or in alignment in the display region 14, as determined.

The reels are housed in a cabinet 20A behind a transparent window not shown. The cabinet of region 20 can be provided with various play buttons, which are associated in a game such as blackjack. For example, button 26 is the payout button 27, 27' and 27" represent the plays of double-up's, split, and stay respectively in blackjack. Buttons 28 and 29 can represent "deal" and "bet".

Usually, the upper region 11 would also have a bet display 16, a win display 17, and a credit display 18, all associated with the microprocessor 13.

Accordingly, there is provided a card game apparatus that includes one or more reels that are associated with a mechanism that physically controls the odds of the reel stopping at any particular reel position in such a manner that the probability of stopping one reel position differs from the probability of stopping at least one other reel position.

Slot machine motor control circuits, which are microprocessor controlled, require tracking of the rotary movement of the indicia-carrying member by the microprocessor. In a known manner such as described in U.S. Pat. No. 6,105,962 tracking means may be provided to cause the stopping of rotation of the reels when the indicia are aligned to determine card suit and value. The apparatus 10 is provided with a start button 24, which activates the computer 13 and the video reels 14, 15. After video reels have stopped their rotation, button 24 starts the rotation of reels 21 and 22. Button 25 can be used to stop rotation of the reels. In this case, either one of the reels can be free spinning or that the reels operate from gears of stator motors of different diameters so that one reel travels faster than the other reel. In such cases, it is the luck of the player and not the programming by the house, which determines the outcome of the reels.

Figure 2:
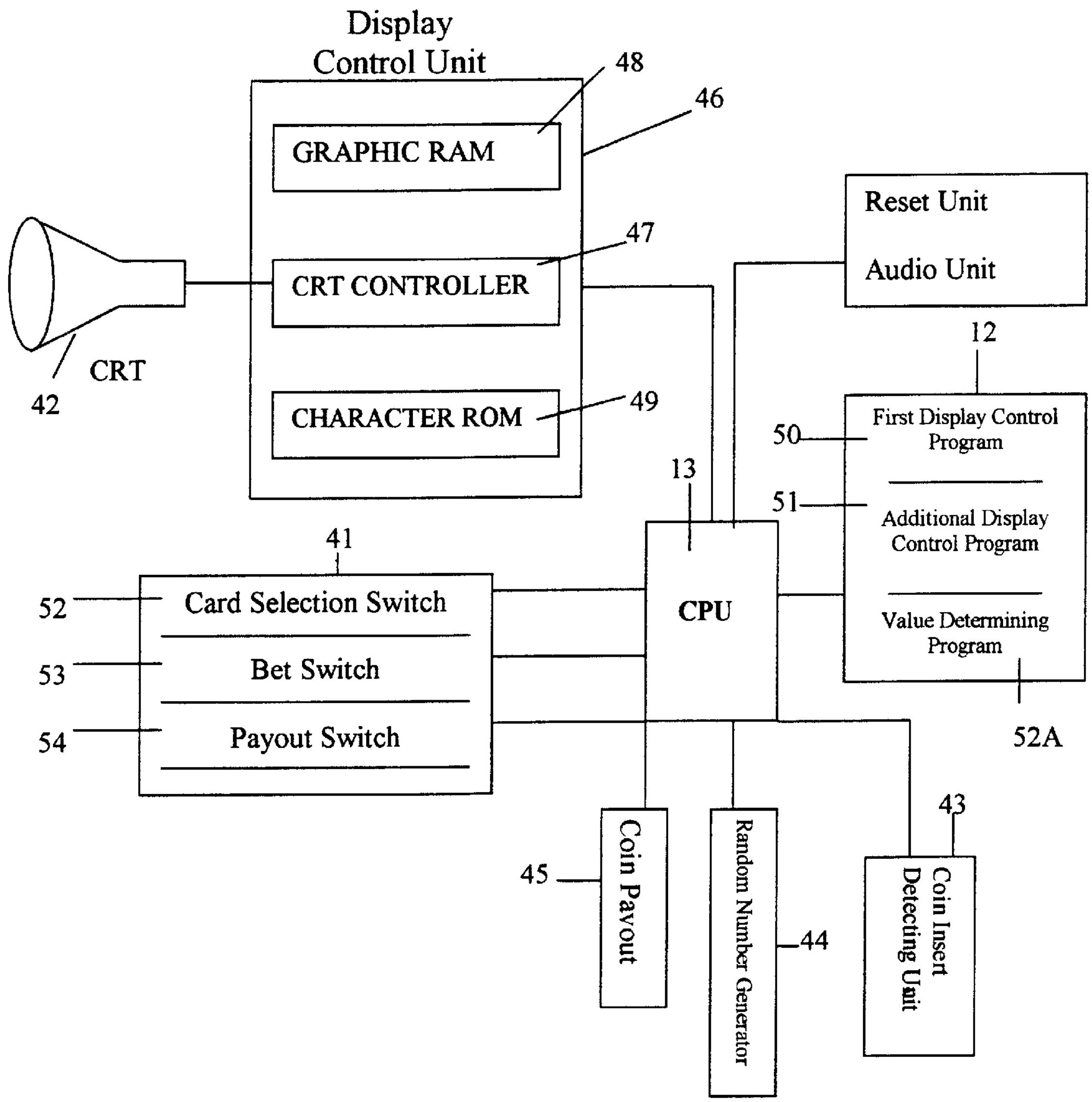
FIG. 2 illustrates a block di gram showing a configuration of a card game apparatus.

FIG. 2 is a block diagram showing a configuration of a card game amusement device of the invention. The card game amusement device comprises a memory device 12 in which every processing program is stored, a CPU 13, for controlling operations of the processing programs, a control panel 41 with every switch arranged. The card game amusement device further comprises a CRT 42, a coin insert detection unit 43 for detecting the insertion of a coin a random number generator 44 for generating a random number, and a coin payout unit 45 for paying out coins, a reset unit for resetting the reels and an audio unit.

The display control unit 46 comprises a CRT controller 47 for controlling the display images to the CRT 42, a graphic RAM unit 48 for temporarily storing graphic data to be sent into the CRT 42, and a character ROM 49 in which character data are stored.

The memory device 12 contains a first display control program 50, which displays the cards on the video display There is provided additional display control program 51 for additional card plays. T ere is also provided a value-determining program 52A for determining whether the plural cards displayed determine a winning hand.

The control panel 41 comprises a card selection switch 52 for selecting one or more cards to be displayed on the video display, a switch 53, for entering a bet and a switch 54 for requesting a payment of coins.

Accordingly, when a coin is inserted through the coin slot, the coin-detecting unit 43 detects the fact of the insertion and the number of coins inserted and transmits to the CPU 13.

Figure 3:
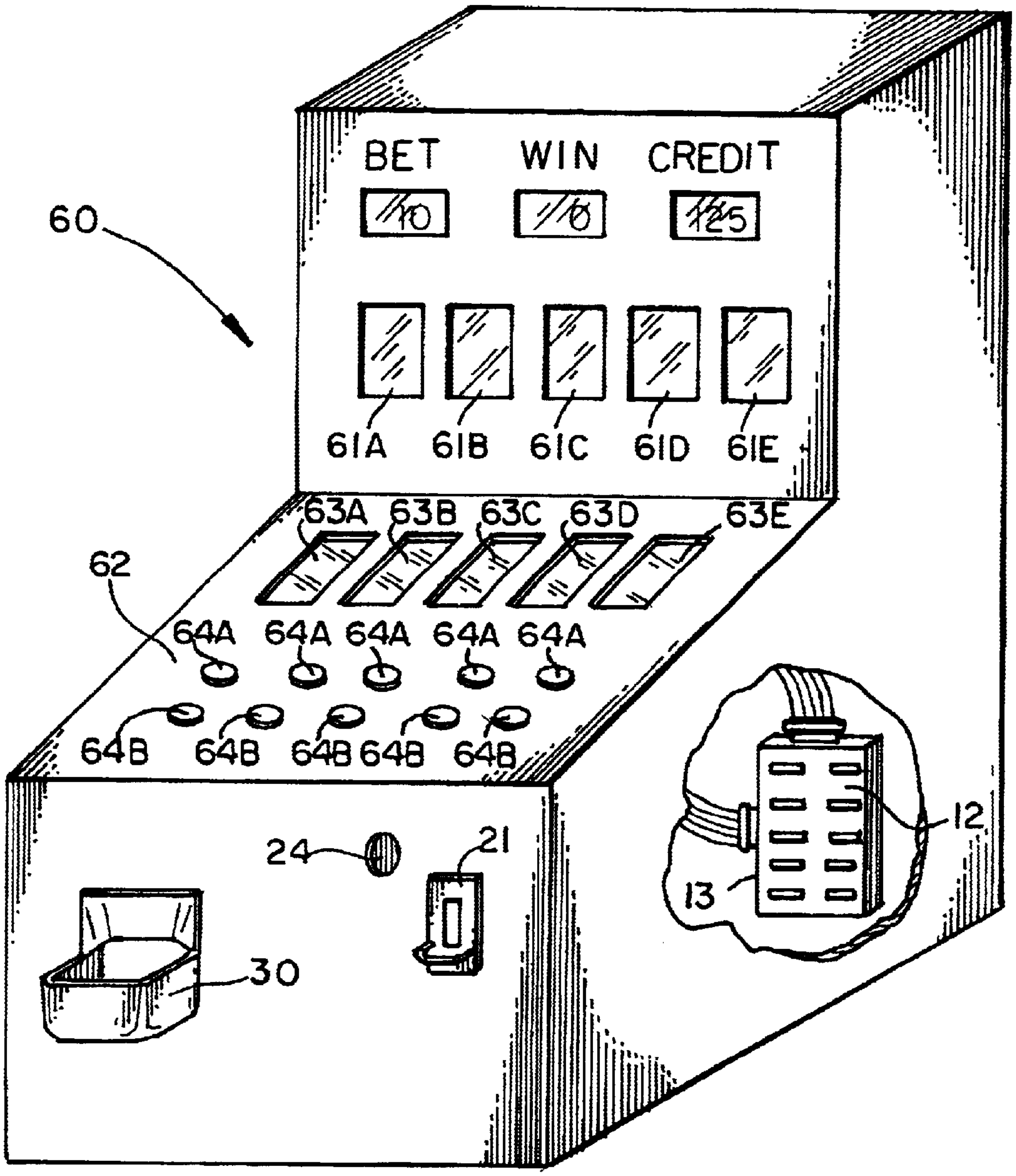
FIG. 3 illustrates a card game apparatus for playing a card game with five cards.

As illustrated in FIG. 3, a card game apparatus 60 may be provided so as to play a card game with five cards, for example, draw poker. The apparatus 60 is provided with a video display 61A, 61B, 61C, 61D, and 61E of five cards which are selected from a program of a memory device 12.

At another region 62, of the apparatus 60 are five reels, which are adapted to display five cards at displays 3k 63B, 63C, 63D, and 63E. Each reels at the display is associated with a "draw" butt 64A and a "hold" button 64B.

The game is played by the cards displayed at the video displays 61A, 61B, 61C, 61D, and 61E being selected from a program of memory 12. The player can the select which of the cards are to be changed by pressing one of the "draw" buttons 64A associated with a reel and/or one of the "hold" buttons 64B so that the player can "stand" or "draw" one or more cards. The player will register a win if the hand he receives is for example a pair of jacks or better. More credit will be given as the hand gets higher, for example, three of a kind, straight, or better. Although the preferred embodiments of this invention have been described, it will be understood that various changes may be made within the scope of the appended claims.

What is claimed:

1. A combination of video card game and a reel card game apparatus in which additional cards are drawn comprising:

a housing having a first region having a first display of a plurality of cards, a second region on said housing having a second display of at least one rotatable reel, said reel having an annular band of playing card indicia which encircles said reel and where a card value and suit is determined by arrival of a particular location, one of said first and second display representing a player's hand the other representing a challenger's hand, at least one control means on said housing associated with a game program and a microprocessor for controlling the drawing of cards appearing at said video display, and manual control means on said housing operated by a player for controlling at least one outcome of the cards appearing on at least one reel display.

2. The apparatus of claim 1 comprising two rotatable reels, one of said reels having the indicia of a card suit and the other having the indicia of a card value.

3. The apparatus of claim 2 including means controlled by the player for stopping rotation of said reels.

4. The apparatus of claim 1 wherein said card game is blackjack.

5. The apparatus of claim 4 comprising a video card display for a dealer and a video card display for a player.

6. The apparatus of claim 1 including a means for resetting said reels.

7. The apparatus of claim 6 wherein the resetting of said reels is controlled by the microprocessor.

8. The apparatus of claim 1 comprising at least two rotatable reels.

9. The apparatus of claim 1, which represents the game draw poker and said video region represents the initial player's hand and the reels represent the cards drawn.

10. The apparatus of claim 1 including audio means controlled by said microprocessor.

* * * * *